T. A. MAXWELL.
CLAMP.
APPLICATION FILED NOV. 10, 1909.
1,035,800.
Patented Aug. 13, 1912.
2 SHEETS—SHEET 2.
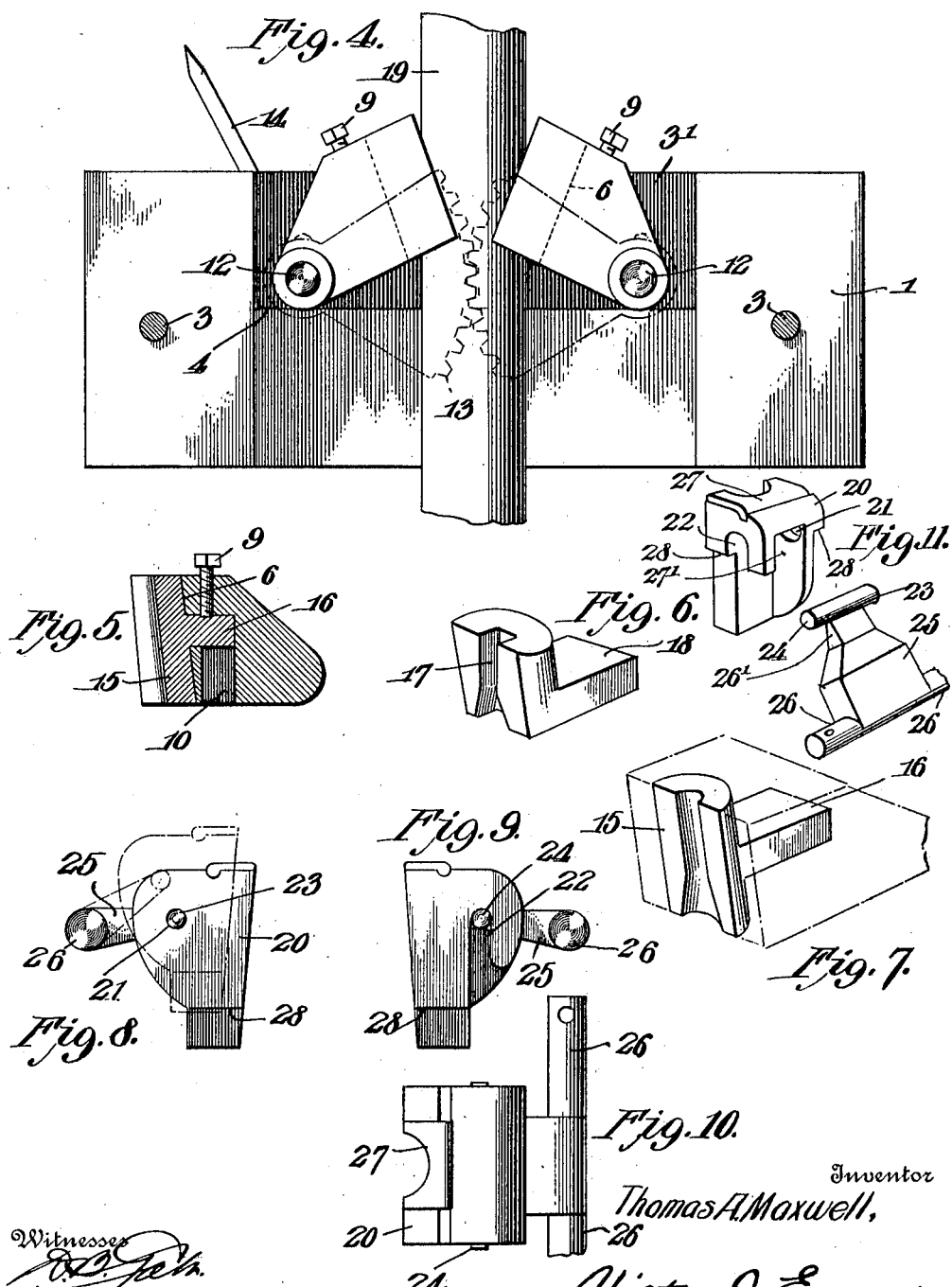

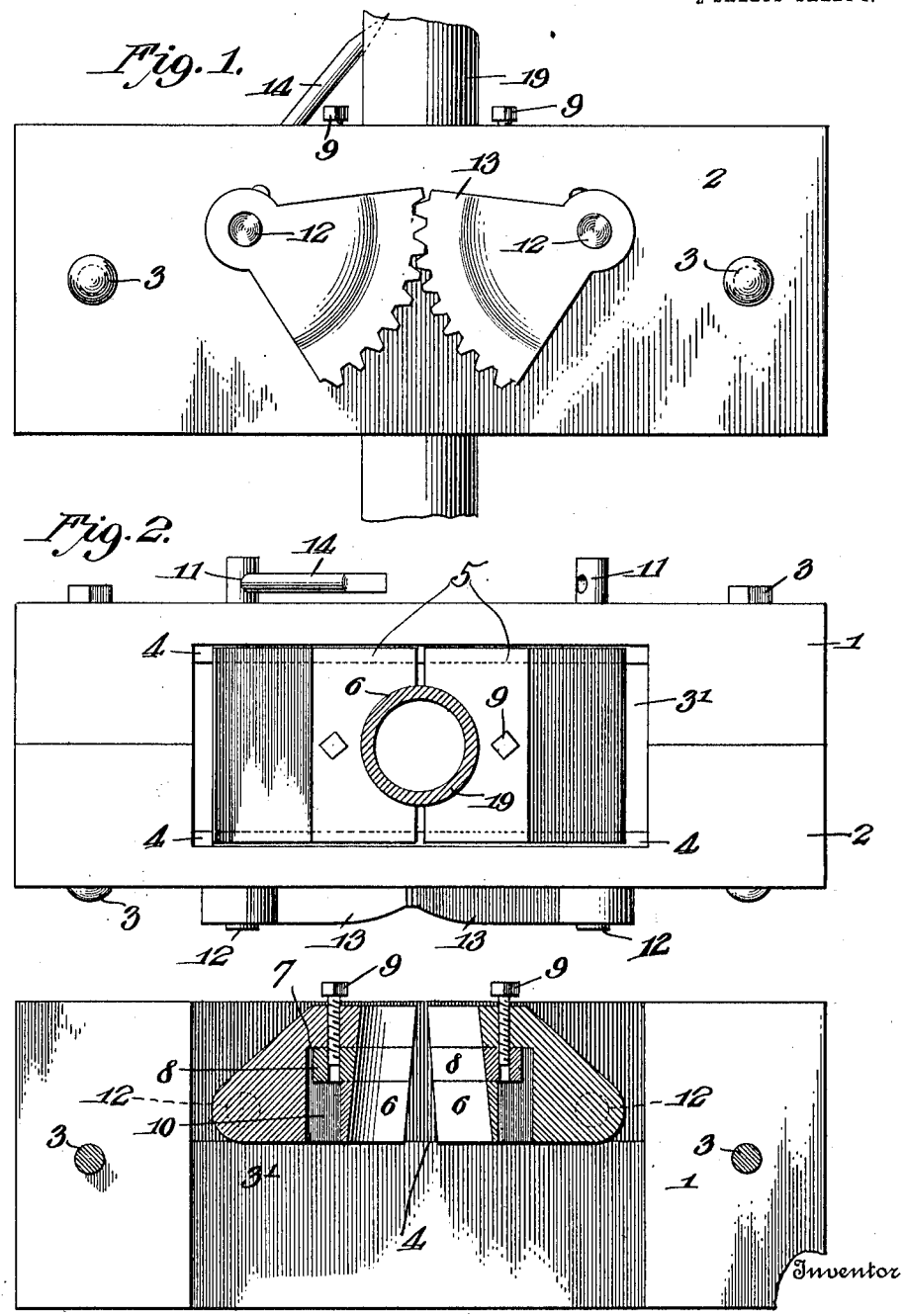

UNITED STATES PATENT OFFICE.

THOMAS A. MAXWELL, OF STEPHENVILLE, TEXAS.

CLAMP.

1,035,800.

Specification of Letters Patent. Patented Aug. 13, 1912.

Application filed November 10, 1909. Serial No. 527,300.

*To all whom it may concern:*

Be it known that I, THOMAS A. MAXWELL, a citizen of the United States, residing at Stephenville, in the county of Erath and State of Texas, have invented new and useful Improvements in Clamps, of which the following is a specification.

This invention relates to tube or rod clamps for wells, and has for an object to provide a device of this character which will be adapted to effectively grasp the said tube or rod to hold it against dropping into the well when it is desired to remove it for the purpose of repairs.

The above mentioned and other objects are attained by the construction, combination and arrangement of parts, as disclosed on the drawings, set forth in this specification, and particularly pointed out in the appended claim.

In the drawings, forming a portion of this specification and in which like numerals of reference indicate similar parts in the several views:—Figure 1 is a side elevation of my improved clamp. Fig. 2 is a top plan view showing the clamp operatively engaged with a tube, the tube being in section. Fig. 3 is a sectional elevation of my improved clamp. Fig. 4 is a sectional elevation of the clamp showing it operatively engaged with the tube. Fig. 5 is a detail vertical section taken through one of the gripping members. Fig. 6 is a detail perspective view of one of the bushings. Fig. 7 is a similar view of another form of bushing. Figs. 8 to 10 inclusive illustrate detail views of a slightly modified form of gripping member. Fig. 11 is a fragmentary perspective view of the gripping member and bushing shown in Figs. 8 to 10 inclusive.

My improved clamp embodies companion members 1 and 2 which are arranged in opposing relation with each other and are securely connected together by bolts or other equivalent fastening devices 3. The clamp is of such construction that will permit of its attachment to the pump casing or any other suitable part thereof, the members 1 and 2 of the said clamp being arranged to straddle the pump tube or rod. The said members 1 and 2 are formed with opposing cavities which together form in the said clamp a central passage 3' for a purpose to be hereinafter more fully described. Each member of the clamp is formed with a longitudinally extending shoulder 4 the purpose of which will be hereinafter explained.

Gripping members 5 are arranged in the passage 3' of the clamp and are adapted for rocking movement therein. The said members are identical in construction and it is thought that a description of one will suffice for both. It may be described that each gripping member is formed with a vertical semi-circular recess 6 which communicates with a right angularly extending slot or passage 7. This passage is adapted to receive a steel bushing 8 which is securely held in its adjusted position by means of a clamping screw 9. The bushing of each gripping member is removable and for this purpose I undercut each member to provide a passage 10 which communicates with the slot or passage 7, the said passage being arranged with respect to the bushing so that the latter can be effectively engaged by a removing tool. The bushings 8 in this form of my invention are of such construction that through their engagement with the tube the gripping members will be relieved of considerable wear and when the bushings become worn they may be replaced by new ones at a minimum cost. Each gripping member is formed with trunnions 11 and 12, the trunnion 11 being journaled in the member 1 of the clamp and the trunnion 12 is journaled in the member 2 of the clamp. The trunnions are disposed wholly above the plane of the shoulders 4 so that the lower surfaces of the gripping members adjacent to the ends of the members wholly contact with and rest on the shoulders when in the positions shown in Fig. 3 and thereby relieve the pivots of the members 5 of the strain. From this construction each gripping element is mounted within the passage 3' for rocking movement. The trunnions 12 of the gripping members have secured thereto rack segments 13 whose teeth intermesh with each other. One of the said trunnions 11 is provided with an operating handle 14 which may be oscillated manually to impart to the gripping members the desired rocking movement.

It frequently happens that some well tubes are smaller than others and I therefore provide for each gripping member a bushing 15 which is adapted to extend longitudinally in the cavities 6 to decrease the area thereof. The bushing 15 has formed integrally therewith a lug 16 against which the clamping screw 9 is adapted to be engaged.

The bushing shown in Fig. 6 is similar to the one shown in Fig. 5 with the exception of the formation of the cavity 17, this being of angular form and is adapted for engagement with the correspondingly formed walls or surfaces of a squared pump rod. The bushing just described is formed with a lug 18 similar to the lug 16. The cavities 6 of the gripping members have their walls flared downwardly and outwardly preferably, and as shown to best advantage in Fig. 2 the cavities oppose each other and are adapted to straddle the tube 19 shown in Fig. 2.

In the form of gripping member shown in Figs. 8 to 10 inclusive, the member 20 is formed at one side with an aperture 21 and at the other side with a vertical slot 22, the aperture 21 receiving the pintle 23 and the slot 22 the pintle 24 upon a trunnion-carrying member 25. The member 25 is provided with outwardly extending trunnions 26 which are identical with the trunnions 11 and 12 described in the preferred form of gripping member. The member 25 is provided with a neck 26' which is movable between the walls of a slot 27' in the member 20. The gripping member 20 is provided with a semi-circular bushing 27. In this form of gripping member the lower extremity is reduced to form shoulders 28 which are adapted to rest against the shoulders 4 of the clamp members 1 and 2. The co-engagement of the just described shoulders effectively serves to limit the downward swinging movement of the gripping member.

The construction of the clamp herein set forth and shown is extremely simple, may be applied conveniently and effectively to the pump casing or to any other suitable part thereof, and the use of such contrivance affords means whereby the well tube or the pump rod can be engaged by the herein described gripping members and held against accidental dropping into the well.

I claim:—

A clamp comprising a sectional frame forming a central longitudinal recess, a pair of clamping members pivoted to the walls of said recess and provided with under-cut portions on their inner ends and slots opening through said inner ends and communicating with said under-cut portions, gripping members removable through said slots and said under-cut portions and screws extending through the upper end portions of said clamping members and holding said gripping members in alinement with the inner faces of said clamping members, the walls of said recess being formed with shoulders forming seats for said clamping members and said clamping members being arranged for simultaneous action.

In testimony whereof I affix my signature in presence of two witnesses.

THOMAS A. MAXWELL.

Witnesses:
A. P. GENTRY,
FRANK GRANBURY.

Copies of this patent may be obtained for five cents each, by addressing the "Commissioner of Patents, Washington, D. C."